US010968329B2

(12) United States Patent
Ishihara et al.

(10) Patent No.: US 10,968,329 B2
(45) Date of Patent: *Apr. 6, 2021

(54) METHOD OF RECOVERING DECOMPOSITION PRODUCT OF THERMOSETTING RESIN CURED PRODUCT AND METHOD OF PRODUCING RECYCLED MATERIAL

(71) Applicant: HITACHI CHEMICAL COMPANY, LTD., Tokyo (JP)

(72) Inventors: Kanako Ishihara, Tokyo (JP); Kazuhito Kobayashi, Tokyo (JP)

(73) Assignee: SHOWA DENKO MATERIALS CO., LTD., Tokyo (JP)

( * ) Notice: Subject to any disclaimer, the term of this patent is extended or adjusted under 35 U.S.C. 154(b) by 256 days.

This patent is subject to a terminal disclaimer.

(21) Appl. No.: 15/743,585

(22) PCT Filed: Mar. 8, 2016

(86) PCT No.: PCT/JP2016/057159
§ 371 (c)(1),
(2) Date: Jan. 10, 2018

(87) PCT Pub. No.: WO2017/154102
PCT Pub. Date: Sep. 14, 2017

(65) Prior Publication Data
US 2018/0371203 A1    Dec. 27, 2018

(51) Int. Cl.
C08J 11/16      (2006.01)
C08J 11/24      (2006.01)
C08J 11/10      (2006.01)
B29B 17/00     (2006.01)

(52) U.S. Cl.
CPC .............. *C08J 11/16* (2013.01); *B29B 17/00* (2013.01); *C08J 11/10* (2013.01); *C08J 11/24* (2013.01); *C08J 2300/24* (2013.01); *C08J 2300/30* (2013.01); *C08J 2363/00* (2013.01); *Y02W 30/62* (2015.05)

(58) Field of Classification Search
CPC .................................. C08J 11/16; C08J 11/24
USPC ..................................................... 264/37.28
See application file for complete search history.

(56) References Cited

U.S. PATENT DOCUMENTS

| | | | | |
|---|---|---|---|---|
| 5,410,008 A * | 4/1995 | Bauer | ................ | C08G 18/6415 252/182.24 |
| 6,168,908 B1 * | 1/2001 | Suzuki | ..................... | G03F 7/00 430/325 |
| 6,465,531 B1 * | 10/2002 | Thai | ....................... | C08G 59/50 521/40 |
| 6,465,702 B1 * | 10/2002 | Von Gentzkow | ....... | B29B 17/02 585/241 |
| 6,962,628 B1 * | 11/2005 | Shibata | .................. | H05K 3/288 134/13 |
| 2002/0170474 A1 * | 11/2002 | Oyasato | .............. | B29B 17/0404 521/49 |
| 2003/0229152 A1 * | 12/2003 | Fukaya | ................ | C08G 18/089 521/49 |
| 2009/0171113 A1 * | 7/2009 | Anderson | ............... | C07C 51/09 560/78 |
| 2009/0198012 A1 * | 8/2009 | Sakata | ........................ | C08J 5/24 524/606 |
| 2010/0286302 A1 * | 11/2010 | Ryu | ...................... | C08G 59/245 522/109 |
| 2011/0009507 A1 | 1/2011 | Shibata et al. | | |
| 2011/0086930 A1 * | 4/2011 | Izumitani | ................. | C08J 11/14 521/48 |
| 2011/0184091 A1 * | 7/2011 | Mizuki | .............. | C08G 59/4238 523/428 |
| 2013/0217805 A1 * | 8/2013 | Hayashi | ..................... | C08J 5/24 523/427 |
| 2014/0221510 A1 * | 8/2014 | Liang | ......................... | C08J 5/04 521/40 |
| 2014/0342144 A1 * | 11/2014 | Nakayama | ................. | C08J 5/24 428/220 |
| 2015/0210813 A1 * | 7/2015 | Arai | .......................... | C08J 5/24 428/298.7 |
| 2016/0002460 A1 * | 1/2016 | Nomura | ..................... | C08J 5/24 524/558 |

FOREIGN PATENT DOCUMENTS

CN      101368087 A   *   2/2009
JP      2001-172426 A       6/2001
(Continued)

OTHER PUBLICATIONS

International Search Report for PCT/JP2016/057159 dated Jun. 7, 2016; English translation submitted herewith (5 pages).

*Primary Examiner* — Robert C Dye
*Assistant Examiner* — Guy F Mongelli
(74) *Attorney, Agent, or Firm* — Fitch, Even, Tabin & Flannery, L.L.P.

(57) ABSTRACT

A method of recovering a decomposition product of a thermosetting resin cured product, the method includes a step of contacting an object to be treated, that contains a thermosetting resin cured product, with a treatment liquid containing an alkali metal compound and an alcohol solvent, to decompose and dissolve the thermosetting resin cured product; a step of mixing the treatment liquid, in which a decomposition product of the thermosetting resin cured product is dissolved, and an acidic aqueous solution to separate the mixture into an aqueous layer and an organic layer containing the decomposition product; and a step of recovering the organic layer.

7 Claims, No Drawings

(56) References Cited

FOREIGN PATENT DOCUMENTS

| | | | | | |
|---|---|---|---|---|---|
| JP | 2001172426 A | * | 6/2001 | ............. | C08J 11/10 |
| JP | 2005-255899 A | | 9/2005 | | |
| JP | 2005255835 A | * | 9/2005 | | |
| JP | 2005255902 A | * | 9/2005 | | |
| JP | 2007297641 A | * | 11/2007 | | |
| JP | 2009-007416 A | | 1/2009 | | |
| JP | 2011026483 A | * | 2/2011 | ................ | C08J 5/24 |
| JP | 2012-082371 A | | 4/2012 | | |
| JP | 2013-006948 A | | 1/2013 | | |
| WO | WO-0125317 A2 | * | 4/2001 | ............. | C08J 11/10 |
| WO | 2009/081974 A1 | | 5/2011 | | |

* cited by examiner

METHOD OF RECOVERING DECOMPOSITION PRODUCT OF THERMOSETTING RESIN CURED PRODUCT AND METHOD OF PRODUCING RECYCLED MATERIAL

CROSS-REFERENCE TO RELATED APPLICATIONS

This application is a U.S. national phase application filed under 35 U.S.C. § 371 of International Application No. PCT/JP2016/057159, filed Mar. 8, 2016, designating the United States, which is hereby incorporated herein by reference in its entirety.

TECHNICAL FIELD

The present invention relates to a method of recovering a decomposition product of a thermosetting resin cured product and a method of producing a recycled material.

BACKGROUND ART

Fiber reinforced plastics (FRPs) using fiber such as glass fiber as a reinforcing material are lightweight, high strength, and high elasticity materials, and are widely used for members of small vessels, automobiles, railroad vehicles, and the like. Carbon fiber reinforced plastics (CFRPs) using carbon fibers as a reinforcing material are developed for the purpose of achieving further lighter weight, higher strength, and higher elasticity, and used for members of aircraft, automobiles, and the like.

CFRP is produced, for example, by impregnating a carbon fiber base material with a thermosetting resin composition and heating the resultant to obtain a prepreg, and then firing the prepreg under pressure in an autoclave.

In a process of producing CFRP in the final shape, a large amount of discards of prepreg and CFRP are produced. A large amount of waste material of CFRP is also generated when disposing a member using CFRP. Therefore, it is desired to recover carbon fibers from CFRP or prepreg, and use them for recycling.

In order to recover carbon fibers from CFRP or prepreg, it is necessary to remove a thermosetting resin cured product. Conventionally, 1) a method of thermally decompose a thermosetting resin cured product by burning at a high temperature of about from 500° C. to 700° C., 2) a method of decomposing (depolymerizing) and dissolving a thermosetting resin cured product using a treatment liquid, and the like are known as treatment methods for removing a thermosetting resin cured product. In particular, the treatment method 2) has attracted attention because it has an advantage such as not only carbon fibers but also a decomposition product of the thermosetting resin cured product can be recovered.

For example, Japanese Patent Application Laid-Open (JP-A) No. 2001-172426 discloses a method of decomposing and dissolving an epoxy resin cured product using a treatment liquid containing a catalyst, such as tripotassium phosphate, trisodium phosphate, or potassium hydroxide, and an organic solvent, and recovering a decomposition product.

JP-A No. 2005-255899 discloses a method of decomposing and dissolving an acid anhydride-cured epoxy resin using a treatment liquid containing benzyl alcohol and an alkali metal phosphate as a catalyst from which moisture has been removed, and recovering a decomposition product.

SUMMARY OF INVENTION

Technical Problem

When a thermosetting resin cured product is decomposed and dissolved using a treatment liquid as described above, a recovered decomposition product may contain an alkali metal derived from a catalyst, and therefore, it is desirable to remove the alkali metal in recycling the decomposition product. However, as a result of the study by the present inventors, it is found that, even when extraction operation is carried out by adding water to a treatment liquid in which a decomposition product of a thermosetting resin cured product is dissolved, an intermediate layer is formed in addition to an aqueous layer and an organic layer, which results in reduction in the recovery rate of the decomposition product.

The present disclosure aims to provide a method of recovering a decomposition product of a thermosetting resin cured product capable of efficiently recovering a decomposition product with a reduced amount of alkali metal, and a method of producing a recycled material capable of efficiently producing as a recycled material a decomposition product with a reduced amount of alkali metal.

Solution to Problem

Specific means for solving the above problems includes the following embodiments.

<1> A method of recovering a decomposition product of a thermosetting resin cured product, the method including:
a step of contacting an object to be treated, that contains a thermosetting resin cured product, with a treatment liquid containing an alkali metal compound and an alcohol solvent to decompose and dissolve the thermosetting resin cured product;
a step of mixing the treatment liquid, in which a decomposition product of the thermosetting resin cured product is dissolved, and an acidic aqueous solution to separate the mixture into an aqueous layer and an organic layer containing the decomposition product; and
a step of recovering the organic layer.

<2> The method of recovering a decomposition product of a thermosetting resin cured product according to <1>, wherein the thermosetting resin cured product includes an epoxy resin cured product.

<3> The method of recovering a decomposition product of a thermosetting resin cured product according to <1> or <2>, wherein the alkali metal compound contains at least one selected from the group consisting of a hydroxide, a borohydride, an amide compound, a fluoride, a chloride, a bromide, an iodide, a borate, a phosphate, a carbonate, a sulfate, a nitrate, an organic acid salt, an alcoholate and a phenolate, of an alkali metal.

<4> The method of recovering a decomposition product of a thermosetting resin cured product according to any one of <1> to <3>, wherein the alcohol solvent includes a solvent having a boiling point of 150° C. or higher at atmospheric pressure.

<5> The method of recovering a decomposition product of a thermosetting resin cured product according to any one of <1> to <4>, wherein:
the object to be treated further includes an inorganic material; and the method further includes a step of removing the inorganic material from the treatment liquid in which the decomposition product is dissolved, before mixing the treatment liquid in which the decomposition product is dissolved and the acidic aqueous solution.

<6> The method of recovering a decomposition product of a thermosetting resin cured product according to <5>, wherein the inorganic material includes carbon fibers.

<7> A method of producing a recycled material including:

a step of contacting an object to be treated, that contains a thermosetting resin cured product, with a treatment liquid containing an alkali metal compound and an alcohol solvent, to decompose and dissolve the thermosetting resin cured product;

a step of mixing the treatment liquid, in which a decomposition product of the thermosetting resin cured product is dissolved, and an acidic aqueous solution to separate the mixture into an aqueous layer and an organic layer containing the decomposition product; and a step of recovering the organic layer to obtain the decomposition product as a recycled material.

Advantageous Effects of Invention

According to the present disclosure, a method of recovering a decomposition product of a thermosetting resin cured product capable of efficiently recovering a decomposition product with a reduced amount of alkali metal, and a method of producing a recycled material capable of efficiently producing a decomposition product with a reduced amount of alkali metal as a recycled material can be provided.

DESCRIPTION OF EMBODIMENTS

Hereinbelow, embodiments of the present invention are described. However, the present invention is not limited to the following embodiments. In the following embodiments, the constituent elements (including an elemental step or the like) are not always indispensable unless otherwise specified. The same applies to numerical values and ranges thereof, and the invention is not limited thereby.

The term "step" as used herein includes not only a separate step but also a step that is not clearly distinguished from other steps as long as the desired effect of the step is obtained therefrom.

As used herein, the notation "to" expressing a numerical range indicates a range including the numerical values before and after "to", as the minimum value and the maximum value, respectively.

Regarding numerical ranges described in a stepwise manner, an upper value or a lower value of one numerical range described in a stepwise manner may be replaced with an upper value or a lower value of another numerical range described in a stepwise manner. Regarding a numerical range described herein, an upper value or a lower value of the numerical range may be replaced with a value shown in a working example.

As regard to the amount of a component of a composition, when plural substances corresponding to the same component exist in the composition, the amount of the component in the composition refers to a total amount of the plural substances in the composition unless otherwise specified.

<Method of Recovering Decomposition Product of Thermosetting Resin Cured Product>

The method of recovering a decomposition product of a thermosetting resin cured product (hereinafter, also simply referred to as "recovery method of the present embodiment") includes: a step of contacting an object to be treated, that contains a thermosetting resin cured product, with a treatment liquid containing an alkali metal compound and an alcohol solvent, to decompose and dissolve the thermosetting resin cured product; a step of mixing the treatment liquid, in which a decomposition product of the thermosetting resin cured product (hereinafter, also simply referred to as "decomposition product") is dissolved, and an acidic aqueous solution to separate the mixture into an aqueous layer and an organic layer containing the decomposition product; and a step of recovering the organic layer. The recovery method of the present embodiment may further include another step if necessary.

According to the recovery method of the present embodiment, by mixing the treatment liquid, in which the decomposition product is dissolved, and the acidic aqueous solution to separate the mixture into an aqueous layer and an organic layer containing the decomposition product, the decomposition product with a reduced amount of alkali metal can be efficiently recovered. The reason is not necessarily clear, but the present inventors suppose the reason as follows.

In a case in which the alkali metal compound included in the treatment liquid contains an alkali metal M, it is considered that the decomposition product dissolves in the treatment liquid in a state of, for example, the following formula: R—O$^-$M$^+$. In a case in which the treatment liquid, in which the decomposition product is dissolved, and an acidic aqueous solution are mixed, it is presumed that the decomposition product becomes a decomposition product in an R—OH state and remains in the organic layer, and M$^+$ moves to the aqueous layer, whereby the amount of the alkali metal contained in the decomposition product is reduced.

In the following, first, an object to be treated, a treatment liquid, and an acidic aqueous solution used in the recovery method of the present embodiment are described, and then the recovery method of the present embodiment is explained.

Object to be Treated

An object to be treated in the recovery method of the present embodiment contains a thermosetting resin cured product. Examples of the thermosetting resin cured product include a cured product of a thermosetting resin such as an epoxy resin, an unsaturated polyester resin, a polyimide resin, a polyamide resin, a polyamideimide resin, a phenol resin, or a melamine resin. The thermosetting resin cured product may be used singly, or two or more kinds thereof may be used in combination. From the viewpoint of the decomposition efficiency by a treatment liquid described-below, the thermosetting resin cured product preferably contains at least one selected from the group consisting of an epoxy resin cured product and an unsaturated polyester resin cured product, and more preferably contains an epoxy resin cured product.

The object to be treated may contain a thermoplastic resin other than the thermosetting resin cured product. Examples of the thermoplastic resin include a polyethylene resin, a polypropylene resin, a polyvinyl chloride resin, a polyvinylidene chloride resin, a polystyrene resin, a polyvinyl acetate resin, a polyurethane resin, a polycarbonate resin, a polyacetal resin, and a polyethylene terephthalate resin. The thermoplastic resin may be used singly, or two or more kinds thereof may be used in combination.

The object to be treated is obtained, for example, by heating a thermosetting resin composition containing a thermosetting resin and curing at least a part of the thermosetting resin. The object to be treated may contain an uncured thermosetting resin.

In a case in which the object to be processed contains an epoxy resin cured product, the object to be treated is obtained, for example, by heating a thermosetting resin composition containing an epoxy resin, a curing agent and, if necessary, a curing accelerator, and curing at least a part of the epoxy resin.

Examples of the epoxy resin include a bisphenol A epoxy resin, a bisphenol F epoxy resin, a bisphenol S epoxy resin, an alicyclic epoxy resin, an aliphatic chain epoxy resin, a phenol novolac epoxy resin, a cresol novolac epoxy resin, a bisphenol A novolac epoxy resin, a diglycidyl etherified product of biphenol, a diglycidyl ether compound of naphthalene diol, a diglycidyl ether compound of a phenol compound, and a diglycidyl ether compound of an alcohol compound, and an alkyl substituted product thereof, a halide thereof, and a hydrogenated product thereof. The epoxy resin may be used singly, or two or more kinds thereof may be used in combination.

Examples of the curing agent include an acid anhydride, an amine compound, a phenol compound, and an isocyanate compound. The curing agent may be used singly, or two or more kinds thereof may be used in combination. Among these, the curing agent is preferably an acid anhydride. In other words, the object to be treated preferably contains an acid anhydride-cured epoxy resin. The acid anhydride-cured epoxy resin has an ester bond in the molecule, and can be more efficiently decomposed using a treatment liquid described-below.

Examples of the acid anhydride include phthalic anhydride, tetrahydrophthalic anhydride, hexahydrophthalic anhydride, methyltetrahydrophthalic anhydride, methylhexahydrophthalic anhydride, methylnadic anhydride, succinic anhydride, dodecylsuccinic anhydride, chlorenedic anhydride, itaconic anhydride, maleic anhydride, pyromellitic anhydride, trimellitic anhydride, benzophenonetetracarboxylic dianhydride, ethylene glycol bistrimellitate dianhydride, glycerol tris-trimellitate trianhydride, polyadipic acid anhydride, polyazelaic acid anhydride, and polysebacic acid anhydride. The acid anhydride may be used singly, or two or more kinds thereof may be used in combination.

Examples of the curing accelerator include an imidazole compound, a tertiary amine compound, a quaternary ammonium salt, and an organic phosphorus compound. The curing accelerator may be used singly, or two or more kinds thereof may be used in combination.

It is preferable that the object to be treated further includes an inorganic material. Examples of the inorganic material include carbon, glass, a metal, and a metal compound. Examples of the shape of the inorganic material include fibers, particles, and foil. The fibers may be in the form of a nonwoven fabric or a woven fabric. In the case of the woven fabric, the woven fabric may be a cloth material made by weaving a fiber bundle, or a uni-directional (UD) material in which fiber bundles are arranged in one direction. The inorganic material may be used singly, or two or more kinds thereof may be used in combination.

Among inorganic materials, the object to be treated preferably includes carbon fibers. By decomposing and dissolving the thermosetting resin cured product, carbon fibers contained in the object to be treated can be recovered and used for recycling. The carbon fibers may be made of an acrylic resin as a raw material, or may be made of pitch as a raw material.

The object to be treated containing carbon fibers is obtained by, for example, impregnating a carbon fiber base material with a thermosetting resin composition and heating the resultant. The object to be treated containing carbon fibers may be a prepreg in a B-stage state in which a thermosetting resin is semi-cured, or a cured body in a C-stage state (CFRP) in which a thermosetting resin is cured.

The size of the object to be treated is not particularly limited, and may be adjusted to a size that can be treated according to the scale of a treatment device. From the viewpoint of shortening the treatment time, the object to be treated is preferably as small as possible. In a case in which the object to be treated contains an inorganic material such as carbon fibers, from the viewpoint of recycling the recovered inorganic material, the object to be treated is preferably large. In one embodiment, the size of the object to be treated is adjusted to a range of from $0.1$ $cm^3$ to $1.5$ $m^3$. In a case in which the object to be treated containing carbon fibers is cut into small pieces, the recovered carbon fibers can be used, for example, for manufacturing a nonwoven fabric.

Treatment Liquid

The treatment liquid used in the recovery method of the present embodiment includes an alkali metal compound and an alcohol solvent. The treatment liquid may further contain another component if necessary.

The alkali metal compound is not particularly limited as long as it has catalytic activity to decompose the thermosetting resin cured product. The alkali metal compound may be used singly, or two or more kinds thereof may be used in combination. Examples of the alkali metal include lithium, sodium, potassium, rubidium, and cesium.

From the viewpoint of catalytic activity of decomposing the thermosetting resin cured product, the alkali metal compound preferably includes at least one selected from the group consisting of a hydroxide, a borohydride, an amide compound, a fluoride, a chloride, a bromide, an iodide, a borate, a phosphate, a carbonate, a sulfate, a nitrate, an organic acid salt, an alcoholate and a phenolate, of an alkali metal. These alkali metal compounds may be in a form of a hydrate.

From the viewpoint of more efficiently decomposing the thermosetting resin cured product and further reducing the amount of the alkali metal contained in the decomposition product, the alkali metal compound preferably includes at least one selected from the group consisting of a hydroxide, a phosphate and an organic acid salt, of an alkali metal.

Examples of the phosphate include orthophosphate, metaphosphate, hypophosphite, phosphite, hypophosphite, pyrophosphate, trimetaphosphate, tetrametaphosphate, and pyrophosphite.

Examples of the organic acid salt include formate, acetate, citrate, succinate, and oxalate.

From the viewpoint of further improving the decomposition efficiency of the thermosetting resin cured product, the content of the alkali metal compound in the treatment liquid as the total amount with respect to 1,000 g of the alcohol solvent is preferably 0.01 mol or more, more preferably 0.10 mol or more, and still more preferably 0.30 mol or more. From the viewpoints of increasing the dissolvability of the decomposition product and facilitating the preparation of the treatment liquid, the content of the alkali metal compound in the treatment liquid as the total amount with respect to 1,000 g of the alcohol solvent is preferably 10.00 mol or less, more preferably 5.00 mol or less, still more preferably 3.00 mol or less, and even more preferably 1.00 mol or less.

The alcohol solvent is not particularly limited, and examples thereof include 1-butanol, 2-butanol, 2-methyl-1-propanol, 2-methyl-2-propanol, 1-pentanol, 2-pentanol, 3-pentanol, 2-methyl-1-butanol, 2-methyl-2-butanol, 3-methyl-1-butanol, 3-methyl-2-butanol, 2,2-dimethyl-1-propanol, 1-hexanol, 2-hexanol, 3-hexanol, 2-methyl-1-pentanol, 4-methyl-2-pentanol, 2-ethyl-1-butanol, 1-heptanol, 2-heptanol, 3-heptanol, 2-ethyl hexanol, dodecanol, cyclohexanol, 1-methyl cyclohexanol, 2-methyl cyclohexanol, 3-methyl cyclohexanol, 4-methyl cyclohexanol, benzyl alcohol, phenoxy ethanol, 1-(2-hydroxyethyl)-2-pyrrolidone, diacetone alcohol, ethylene glycol, ethylene glycol monomethyl ether, ethylene glycol monoethyl ether, ethylene glycol monopropyl ether, ethylene glycol monobutyl ether, diethylene glycol, diethylene glycol monomethyl ether, diethylene glycol monoethyl ether, diethylene glycol monopropyl ether, diethylene glycol monobutyl ether, triethylene glycol, triethylene glycol monomethyl ether, triethylene glycol monoethyl ether, tetraethylene glycol, polyethylene glycol (molecular weight: from 200 to 400), 1,2-propanediol, 1,3-propanediol, 1,2-butanediol, 1,3-butanediol, 1,4-butanediol, 2,3-butanediol, 1,5-pentane diol, glycerin, and dipropylene glycol. The alcohol solvent may be used singly, or two or more kinds thereof may be used in combination.

From the viewpoint of increasing the temperature of the treatment liquid to improve the decomposition efficiency of the thermosetting resin cured product, the alcohol solvent preferably includes a solvent having a boiling point at atmospheric pressure of 150° C. or higher (hereinafter, also referred to as "high boiling point solvent"). The content of the high boiling point solvent, based on the total amount of the alcohol solvent, is preferably 50% by volume or more, more preferably 70% by volume or more, still more preferably 90% by volume or more, and even more preferably 100% by volume.

The treatment liquid may further contain another component if necessary. Examples of the other component include a surfactant.

Acidic Aqueous Solution

The acidic aqueous solution used in the recovery method of the present embodiment includes an acidic substance. The acidic substance may be used singly, or two or more kinds thereof may be used in combination. The acidic aqueous solution may further include another component if necessary.

The acidic substance is preferably a substance having oxidizing properties from the viewpoint of further reducing the amount of the alkali metal contained in the decomposition product. Examples of the acidic substance include an inorganic acid such as hydrochloric acid or phosphoric acid, and an acidic salt thereof; an organic acid such as sulfonic acid, carboxylic acid, vinyl carboxylic acid or nucleic acid, and an acidic salt thereof; an iron-based flocculant such as ferric chloride; and aluminum-based flocculant such as aluminum sulfate. The acidic substance may be either a weak acid, a strong acid, or a super acid.

From the viewpoint of further reducing the amount of the alkali metal contained in the decomposition product, the acidic substance preferably includes at least one selected from the group consisting of a phosphoric acid, an acidic salt of a phosphoric acid, and a carboxylic acid.

Examples of the phosphoric acid include orthophosphoric acid, metaphosphoric acid, hypophosphorous acid, phosphorous acid, hypophosphorous acid, pyrophosphoric acid, trimetaphosphoric acid, tetrametaphosphoric acid, and pyrophosphorous acid.

Examples of the acidic salt of a phosphoric acid include potassium dihydrogenphosphate and sodium dihydrogenphosphate.

Examples of the carboxylic acid include formic acid, acetic acid, citric acid, succinic acid, and oxalic acid.

The content ratio of the acidic substance in the acidic aqueous solution is not particularly limited. It is preferable that the content of the acidic substance in the acidic aqueous solution is appropriately adjusted according to the concentration of the alkali metal in the treatment liquid in which the decomposition product is dissolved, the mixing ratio of the treatment liquid in which the decomposition product is dissolved and the acidic aqueous solution, and the like.

The pH of the acidic aqueous solution is not particularly limited. The pH of the acidic aqueous solution at room temperature (25° C.) is preferably, for example, from 0 to 7, and more preferably from 1 to 6.

Method of Recovering Decomposition Product of Thermosetting Resin Cured Product

The recovery method of the present embodiment includes: a step of contacting the object to be treated, that contains the thermosetting resin cured product, with the above-described treatment liquid containing the alkali metal compound and the alcohol solvent, to decompose and dissolve the thermosetting resin cured product (hereinafter, also referred to as "treatment step"); a step of mixing the treatment liquid, in which the decomposition product of the thermosetting resin cured product is dissolved, and the above-described acidic aqueous solution to separate the mixture into an aqueous layer and an organic layer containing the decomposition product (hereinafter, also referred to as "separation step"); and a step of recovering the organic layer (hereinafter, also referred to as "recovery step").

In the treatment step, the object to be treated, that contains the thermosetting resin cured product, is contacted with the above-described treatment liquid, to decompose and dissolve the thermosetting resin cured product. The method of decomposing and dissolving a thermosetting resin cured product using the treatment liquid is not particularly limited, and the object to be treated may be immersed in the treatment liquid, or the treatment liquid may be sprayed onto the object to be treated by spraying or the like. From the viewpoint of more efficiently decomposing and dissolving the thermosetting resin cured product, the object to be treated is preferably immersed in the treatment liquid.

In one embodiment, the object to be treated is immersed in the treatment liquid in a container, and if necessary, the treatment liquid is agitated to decompose and dissolve the cured product of the thermosetting resin. The stirring method is not particularly limited, and examples thereof include a method using an agitating blade, a method of generating a jet flow, a method of swinging a container, a method of generating bubbles of an inert gas, and a method of applying ultrasonic waves.

The temperature of the treatment liquid is not particularly limited as long as it is a temperature equal to or lower than the boiling point of the alcohol solvent. From the viewpoint of decomposing and dissolving the thermosetting resin cured product more efficiently, the temperature of the treatment liquid is preferably 100° C. or higher, and more preferably 150° C. or higher. When the object to be treated contains an inorganic material, from the viewpoint of suppressing a damage of the inorganic material, the temperature of the treatment liquid is preferably 300° C. or lower.

The atmosphere at the time of decomposing and dissolving the thermosetting resin cured product using the treatment liquid is not particularly limited, and the atmosphere may be an air atmosphere or an inert gas atmosphere such as nitrogen or argon.

Next, in the separation step, the treatment liquid, in which the decomposition product is dissolved, and the above-described acidic aqueous solution are mixed to separate the mixture into an aqueous layer and an organic layer containing the decomposition product. The mixing method and the method of separating into an aqueous layer and an organic layer are not particularly limited, and examples thereof include a method in which the treatment liquid, in which the decomposition product is dissolved, and the acidic aqueous solution are mixed, stirred, and then allowed to stand.

The mixing ratio of the treatment liquid, in which the decomposition product is dissolved, and the acidic aqueous solution is not particularly limited. From the viewpoint of further reducing the amount of the alkali metal contained in the decomposition product, the mixing ratio of the acidic aqueous solution to the treatment liquid in which the decomposition product is dissolved (acidic aqueous solution/treatment liquid in which the decomposition product is dissolved) is preferably from 0.01 to 100, more preferably from 0.25 to 50, and still more preferably from 1 to 10, based on mass.

From the viewpoint of further reducing the amount of the alkali metal contained in the decomposition product, the mixing ratio of the treatment liquid, in which the decomposition product is dissolved, and the acidic aqueous solution is adjusted in such a manner that the molar amount of the acidic substance to be mixed is preferably from 0.1 to 10 times, more preferably from 1 to 7 times, the molar amount of the alkali metal in the treatment liquid in which the decomposition product is dissolved.

The temperature of a mixed solution obtained by mixing the treatment liquid, in which the decomposition product is dissolved, and the acidic aqueous solution is not particularly limited.

Next, in the recovery step, the organic layer containing the decomposition product is recovered. After the recovering of the organic layer, the alcohol solvent may be removed by distillation or the like. The recovered decomposition product can be recycled into raw materials of a synthetic resin. An acidic aqueous solution may be mixed with the recovered organic layer, and the separation step may be repeated several times. By repeating the separation step several times, the amount of the alkali metal contained in the decomposition product can be further reduced.

In a case in which the object to be treated contains an inorganic material, it is preferable that the recovery method of the present embodiment further includes a step of removing the inorganic material from the treatment liquid, in which the decomposition product is dissolved (hereinafter, also referred to as "removal step"), before mixing the treatment solution in which the decomposition product is dissolved and the acidic aqueous solution.

The inorganic material can be removed from the treatment liquid, for example, by filtering the treatment liquid after decomposing and dissolving the thermosetting resin cured product. The inorganic material recovered through the removal step can be recycled.

<Method of Producing Recycled Material>

The method of producing a regeneration material of the present embodiment (hereinafter, also simply referred to as the "production method of the present embodiment") includes: a step of contacting an object to be treated, that contains a thermosetting resin cured product, with a treatment liquid containing an alkali metal compound and an alcohol solvent, to decompose and dissolve the thermosetting resin cured product; a step of mixing the treatment liquid, in which a decomposition product of the thermosetting resin cured product is dissolved, and an acidic aqueous solution to separate the mixture into an aqueous layer and an organic layer containing the decomposition product; and a step of recovering the organic layer to obtain the decomposition product as a recycled material. The production method of the present embodiment may further include another step if necessary.

According to the production method of the present embodiment, by mixing the treatment liquid, in which the decomposition product is dissolved, and the acidic aqueous solution to separate the mixture into an aqueous layer and an organic layer containing the decomposition product, the decomposition product with a reduced amount of alkali metal can be efficiently produced as a recycled material.

Details and preferred aspects of the object to be treated, the treatment liquid, and the acidic aqueous solution in the production method of the present embodiment, and details and preferred aspects of each step are the same as those in the recovery method of the present embodiment described above.

As in the recovery method of the present embodiment described above, an acidic aqueous solution may be mixed with the recovered organic layer, and the separation step may be repeated several times. By repeating the separation step several times, the decomposition product with a reduced amount of alkali metal can be obtained.

The use application of the recycled material obtained by the production method of the present embodiment is not particularly limited. For example, the recycled material can be used for producing fuel, resin, or the like.

EXAMPLES

Hereinafter, the invention is described more specifically by way of Examples and Comparative Examples. However, the invention is not limited to these examples.

Example 1

[Preparation of Test Piece]

TORAYCA (registered trademark) prepreg (manufactured by Toray Industries, Inc.) using TORAYCA (registered trademark) T300 (manufactured by Toray Industries, Inc.) as a carbon fiber was cut into a size of 10 mm×40 mm to prepare a test piece.

[Preparation of Treatment Liquid]

10 g of a benzyl alcohol (alcohol solvent) and 0.33 mol of tripotassium phosphate (alkali metal compound) per 1,000 g of benzyl alcohol were respectively weighed into a test tube, and the mixture was heated using an oil bath to a temperature in the test tube of 190° C.±2° C. while gently stirring with a spatula from the bottom of the test tube. As a result, a treatment liquid was prepared.

[Preparation of Acidic Aqueous Solution]

11 g of potassium dihydrogenphosphate ($KH_2PO_4$) was added to 50 g of distilled water, and the mixture was stirred to dissolve potassium dihydrogenphosphate, thereby preparing an acidic aqueous solution.

[Recovery of Decomposition Product]

When the temperature of the treatment liquid reached 190° C.±2° C., a test piece in an amount of 20% by mass with respect to the amount of the treatment liquid was gently added to the treatment liquid, and the mixture was treated for 3 hours while maintaining the temperature of the treatment liquid at 190° C.±2° C. under atmospheric atmosphere and atmospheric pressure, thereby decomposing and dissolving the thermosetting resin cured product. Subsequently, solid-liquid separation was performed with a funnel to remove the carbon fiber, and the treatment liquid in which the decomposition product of the thermosetting resin cured product was dissolved was recovered. The potassium ion concentration in the recovered treatment liquid was measured using an atomic absorption photometer (manufactured by Hitachi High-Tech Science Corporation).

Next, 5 g of the recovered treatment liquid and an acidic aqueous solution in a ratio listed in Table 1 were respectively weighed, placed in a test tube, stirred, and allowed to stand for 19 hours to separate into an aqueous layer and an organic layer. In Table 1, the ratio of the acidic aqueous solution used as an extraction liquid is indicated by the ratio (% by mass) of the acidic aqueous solution to the treatment liquid in which the decomposition product is dissolved. The presence or absence of an intermediate layer after standing is shown in Table 1. The intermediate layer was judged as present in a case in which a layer having a width of 1 mm or more was present between the water layer and the organic layer when a ruler was placed on the side of the test tube after standing.

Next, the organic layer was recovered, and the potassium ion concentration in the organic layer was measured using an atomic absorption photometer (manufactured by Hitachi High-Tech Science Corporation). Then, the reduction rate of potassium ions was calculated according to the following formula. The results are shown in Table 1.

Reduction rate (%) of potassium ion=100×(potassium ion concentration in recovered treatment liquid−potassium ion concentration in organic layer)/potassium ion concentration in recovered treatment liquid Examples 2 to 5

The presence or absence of an intermediate layer was determined and the reduction rate of potassium ions was calculated in the same manner as in Example 1 except that the ratio of the acidic aqueous solution used as the extraction liquid was changed as shown in Table 1. The results are shown in Table 1.

Comparative Example 1 to 5

The presence or absence of an intermediate layer was determined and the reduction rate of potassium ions was calculated in the same manner as in Examples 1 to 5 except that distilled water was used as an extraction liquid in place of the acidic aqueous solution. The results are shown in Table 1.

TABLE 1

| | Extraction liquid | Ratio of extraction liquid | Reduction rate of potassium ions | Presence or absence of intermediate layer |
|---|---|---|---|---|
| Example 1 | KH$_2$PO$_4$ aqueous solution | 25% by mass | 96.1% | Absent |
| Example 2 | KH$_2$PO$_4$ aqueous solution | 50% by mass | 96.3% | Absent |
| Example 3 | KH$_2$PO$_4$ aqueous solution | 75% by mass | 97.0% | Absent |
| Example 4 | KH$_2$PO$_4$ aqueous solution | 100% by mass | 97.8% | Absent |
| Example 5 | KH$_2$PO$_4$ aqueous solution | 150% by mass | 97.8% | Absent |
| Comparative Example 1 | Distilled water | 25% by mass | 39.4% | Present |
| Comparative Example 2 | Distilled water | 50% by mass | 63.2% | Present |
| Comparative Example 3 | Distilled water | 75% by mass | 63.6% | Present |
| Comparative Example 4 | Distilled water | 100% by mass | 94.1% | Present |
| Comparative Example 5 | Distilled water | 150% by mass | 94.9% | Present |

As can be seen from Table 1, in each of Comparative Examples 1 to 5 in which extraction was performed with distilled water, the reduction rate of potassium ions was 94.9% even when the ratio of the extraction liquid was 150% by mass. In each of Comparative Examples 1 to 5, an intermediate layer was generated. In contrast, in each of Examples 1 to 5 in which extraction was performed with an aqueous solution of KH$_2$PO$_4$, the reduction rate of potassium ions was 96.1% even when the ratio of the extraction liquid was 25% by mass, and the amount of potassium ions was reduced as compared with Comparative Examples 1 to 5. In each of Examples 1 to 5, no intermediate layer was generated.

Example 6

[Preparation of Test Piece]

TORAYCA (registered trademark) prepreg (manufactured by Toray Industries, Inc.) using TORAYCA (registered trademark) T300 (manufactured by Toray Industries, Inc.) as a carbon fiber was cut into a size of 10 mm×40 mm to prepare a test piece.

[Preparation of Treatment Liquid]

10 g of a benzyl alcohol (alcohol solvent) and 0.66 mol of tripotassium phosphate (alkali metal compound) per 1,000 g of benzyl alcohol were respectively weighed into a test tube, and the mixture was heated using an oil bath to a temperature in the test tube of 190° C.±2° C. while gently stirring with a spatula from the bottom of the test tube. As a result, a treatment liquid was prepared.

[Recovery of Decomposition Product]

When the temperature of the treatment liquid reached 190° C.±2° C., a test piece in an amount of 20% by mass with respect to the amount of the treatment liquid was gently added to the treatment liquid, and the mixture was treated for 3 hours while maintaining the temperature of the treatment liquid at 190° C.±2° C. under atmospheric atmosphere and atmospheric pressure to decompose and dissolve the thermosetting resin cured product. Subsequently, solid-liquid separation was performed with a funnel to remove the carbon fiber, and the treatment liquid in which the decomposition product of the thermosetting resin cured product was dissolved was recovered. The potassium ion concentration in the recovered treatment liquid was measured using an atomic absorption photometer (manufactured by Hitachi High-Tech Science Corporation).

As the extraction liquid, a citric acid aqueous solution was prepared. The molar concentration of citric acid in the extraction liquid was 7 times the molar concentration of potassium ion in the recovered treatment solution. 5 g of the recovered treatment liquid was added to a test tube containing 5 g of the extraction liquid, and the mixture was stirred and allowed to stand for 19 hours to separate into an aqueous layer and an organic layer. The presence or absence of an intermediate layer after standing is shown in Table 2. The intermediate layer was judged as present in a case in which a layer having a width of 1 mm or more was present between the water layer and the organic layer when a ruler was placed on the side of the test tube after standing.

Next, the organic layer was recovered, and the potassium ion concentration in the organic layer was measured using an atomic absorption photometer (manufactured by Hitachi High-Tech Science Corporation). Then, the reduction rate of potassium ions was calculated according to the following formula. The results are shown in Table 1.

Reduction rate (%) of potassium ion=100×(potassium ion concentration in recovered treatment liquid−potassium ion concentration in organic layer)/potassium ion concentration in recovered treatment liquid Examples 7 to 9 and Comparative Examples 6 to 8

The presence or absence of an intermediate layer was determined and the reduction rate of potassium ions was calculated in the same manner as in Example 6 except that the type of the extraction liquid was changed as shown in Table 2. The results are shown in Table 2.

TABLE 2

| | Extraction liquid | Ratio of extraction liquid | Reduction rate of potassium ions | Presence or absence of intermediate layer |
|---|---|---|---|---|
| Example 6 | Citric acid aqueous solution | 100% by mass | 99.8% | Absent |
| Example 7 | acetic acid aqueous solution | 100% by mass | 99.5% | Absent |
| Example 8 | $FeCl_3$ aqueous solution | 100% by mass | 99.2% | Absent |
| Example 9 | $KH_2PO_4$ aqueous solution | 100% by mass | 96.3% | Absent |
| Comparative Example 6 | distilled water | 100% by mass | 94.1% | Present |
| Comparative Example 7 | $K_2HPO_4$ aqueous solution | 100% by mass | 93.1% | Absent |
| Comparative Example 8 | $K_3PO_4$ aqueous solution | 100% by mass | 90.3% | Absent |

As can be seen from Table 2, in Comparative Example 6 in which extraction was performed with distilled water, the reduction rate of potassium ions was 94.1%, and an intermediate layer was generated. In each of Comparative Examples 7 to 8 in which extraction was performed with a basic aqueous solution, no intermediate layer was generated, but the reduction rate of potassium ions was lower than that of Comparative Example 6. On the other hand, in each of Examples 6 to 9 in which extraction was performed with an acidic aqueous solution, the amount of potassium ions was reduced as compared with Comparative Examples 6 to 8 and no intermediate layer was generated.

All documents, patent applications, and technical standards described in the present specification are incorporated herein by reference to the same extent as if each individual document, patent application, and technical standard were specifically and individually indicated to be incorporated by reference.

The invention claimed is:

1. A method of recovering a decomposition product of a thermosetting resin cured product, the method comprising:
   a step of contacting an object to be treated, that contains a thermosetting resin cured product comprising an epoxy resin cured product, with a treatment liquid containing an alkali metal compound and an alcohol solvent, to decompose and dissolve the thermosetting resin cured product;
   a step of mixing the treatment liquid, in which a decomposition product of the thermosetting resin cured product is dissolved, and an acidic aqueous solution to separate a resulting mixture into an aqueous layer and an organic layer containing the decomposition product; and
   a step of recovering the organic layer,
   wherein the acidic aqueous solution comprises at least one acidic substance selected from the group consisting of hydrochloric acid, a phosphoric acid, an acidic salt of a phosphoric acid, ferric chloride, and aluminum sulfate.

2. The method of recovering a decomposition product of a thermosetting resin cured product according to claim 1, wherein the alkali metal compound contains at least one selected from the group consisting of a hydroxide, a borohydride, an amide compound, a fluoride, a chloride, a bromide, an iodide, a borate, a phosphate, a carbonate, a sulfate, a nitrate, an organic acid salt, an alcoholate and a phenolate, of an alkali metal.

3. The method of recovering a decomposition product of a thermosetting resin cured product according to claim 1, wherein the alcohol solvent comprises a solvent having a boiling point of 150° C. or higher at atmospheric pressure.

4. The method of recovering a decomposition product of a thermosetting resin cured product according to claim 1, wherein:
   the object to be treated further comprises an inorganic material; and
   the method further comprises a step of removing the inorganic material from the treatment liquid in which the decomposition product is dissolved, before mixing the treatment liquid in which the decomposition product is dissolved and the acidic aqueous solution.

5. The method of recovering a decomposition product of a thermosetting resin cured product according to claim 4, wherein the inorganic material comprises carbon fibers.

6. The method of recovering a decomposition product of a thermosetting resin cured product according to claim 1, wherein the treatment liquid comprises two or more alkali metal compounds.

7. The method of recovering a decomposition product of a thermosetting resin cured product according to claim 6, wherein the two or more alkali metal compounds are selected from the group consisting of a hydroxide, a borohydride, an amide compound, a fluoride, a chloride, a bromide, an iodide, a borate, a phosphate, a carbonate, a sulfate, a nitrate, an organic acid salt, an alcoholate and a phenolate, of an alkali metal.

* * * * *